United States Patent
Yoneyama

(10) Patent No.: US 6,542,316 B2
(45) Date of Patent: Apr. 1, 2003

(54) WIDE-ANGLE PROJECTION LENS AND A PROJECTION-TYPE IMAGE DISPLAY DEVICE

(75) Inventor: Kazuya Yoneyama, Utsunomiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 50 days.

(21) Appl. No.: 09/938,520

(22) Filed: Aug. 27, 2001

(65) Prior Publication Data

US 2002/0060859 A1 May 23, 2002

(30) Foreign Application Priority Data

Sep. 28, 2000 (JP) ........................................ 2000-295420

(51) Int. Cl.[7] ............................................. G02B 13/04
(52) U.S. Cl. ........................................ 359/749; 359/649
(58) Field of Search ........................... 359/650–51, 676, 359/683, 689, 708, 716, 738–40, 754, 784, 786–91, 713–15, 774, 686–87, 776, 782–83, 694–95, 755–65, 769–772, 649

(56) References Cited

U.S. PATENT DOCUMENTS 5,363,242 A * 11/1994 Yokota ........................ 359/684
5,526,186 A * 6/1996 Sekine ........................ 359/683
5,606,459 A * 2/1997 Nakatsuji .................... 359/683
5,978,150 A * 11/1999 Hamanishi et al. ......... 359/663
6,137,638 A * 10/2000 Yamagishi et al. ......... 359/682

FOREIGN PATENT DOCUMENTS

JP         8-201688         8/1996

* cited by examiner

Primary Examiner—Jordan M. Schwartz
Assistant Examiner—Jessica Stultz
(74) Attorney, Agent, or Firm—Arnold International; Bruce Y. Arnold

(57) ABSTRACT

A wide-angle projection lens is disclosed having three lens groups of negative, positive, and positive refractive power, respectively, in order from the enlarging side, and that favorably corrects both distortion and lateral color. The wide-angle projection lens includes a diaphragm positioned between the second lens group and the third lens group, and is especially suitable for use in a rear-projection-type image display device that uses a multi-display technique wherein multiple projection lenses arranged in an array, with each projection lens displaying image information for a particular segment of the image to be displayed. By satisfying specified conditions, the wide-angle projection lens, when used in a projection-type image display device, enables the image display device to be more compact.

25 Claims, 6 Drawing Sheets

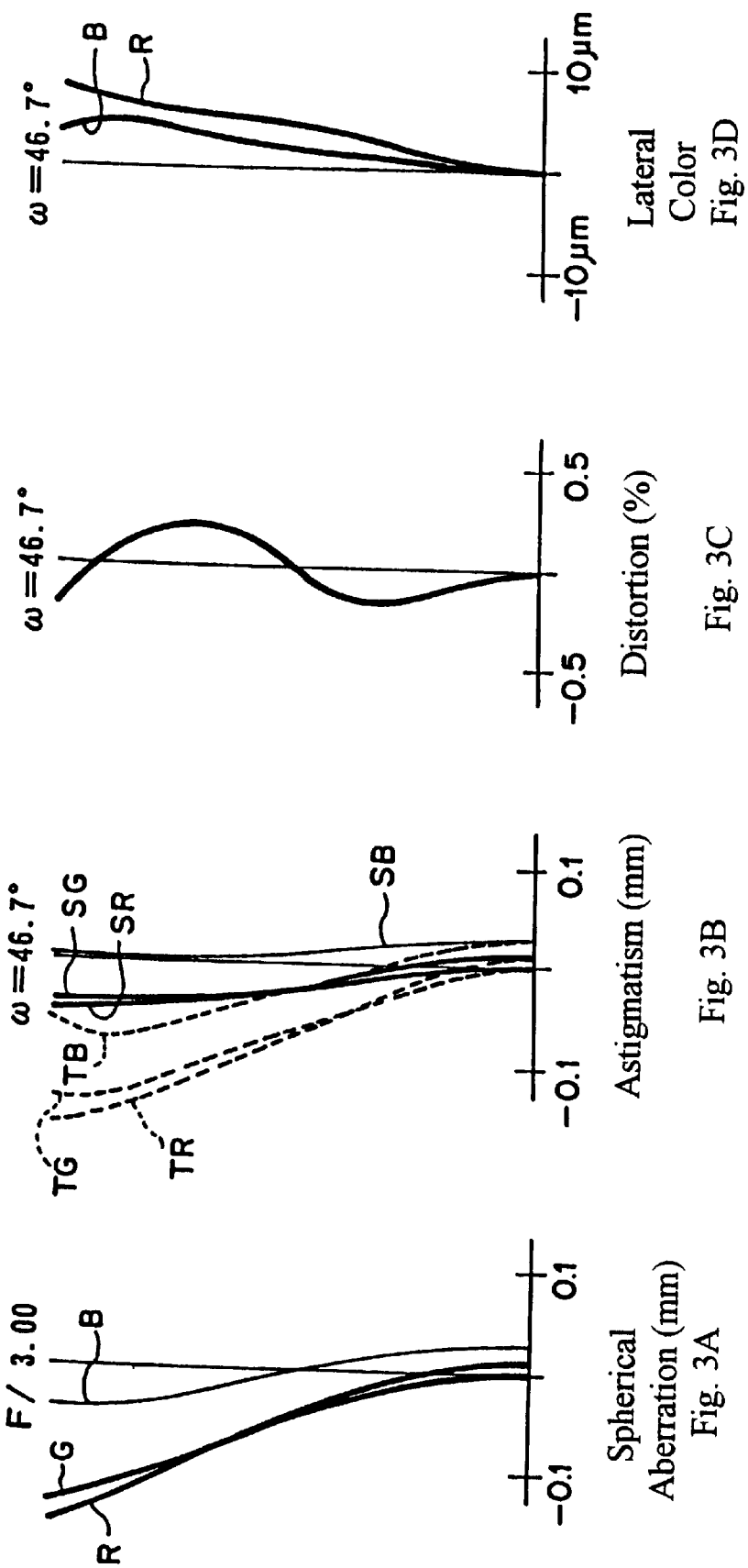

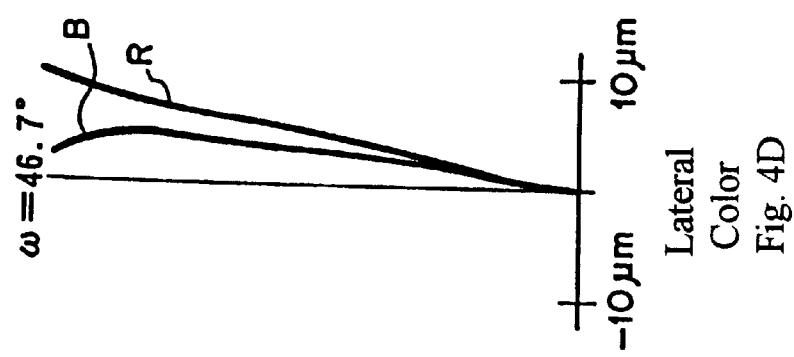
Fig. 4D Lateral Color
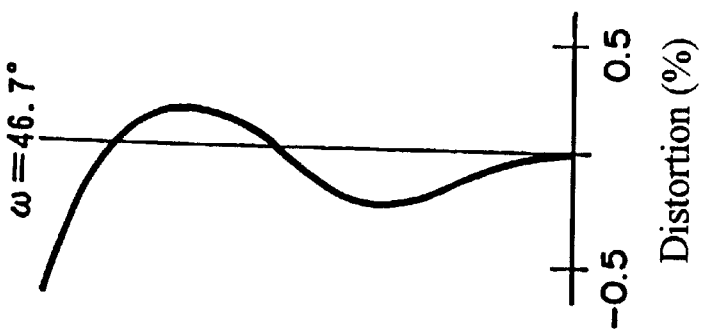
Fig. 4C Distortion (%)
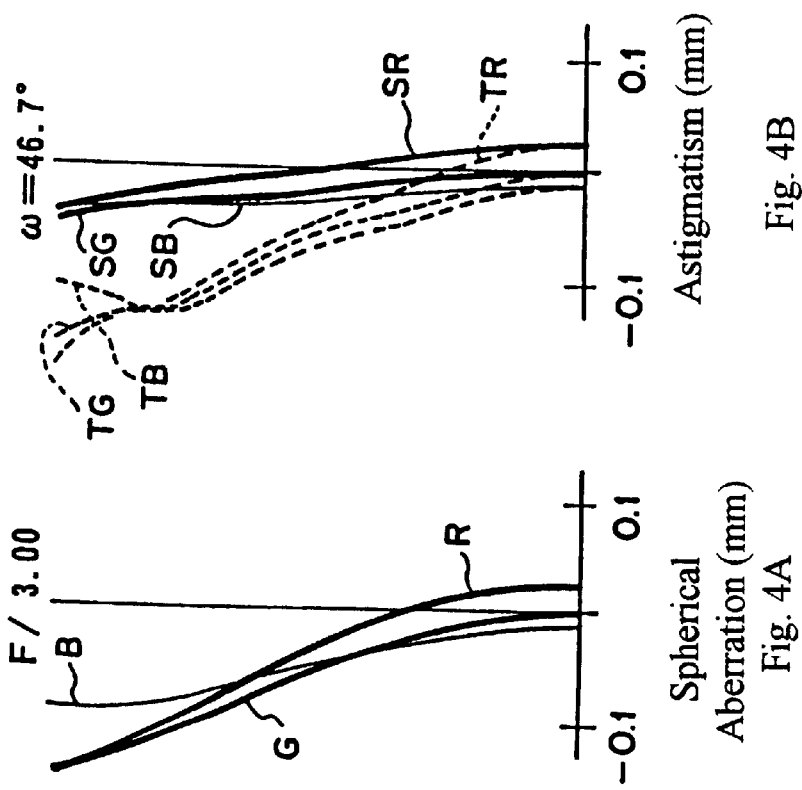
Fig. 4B Astigmatism (mm)
Fig. 4A Spherical Aberration (mm)

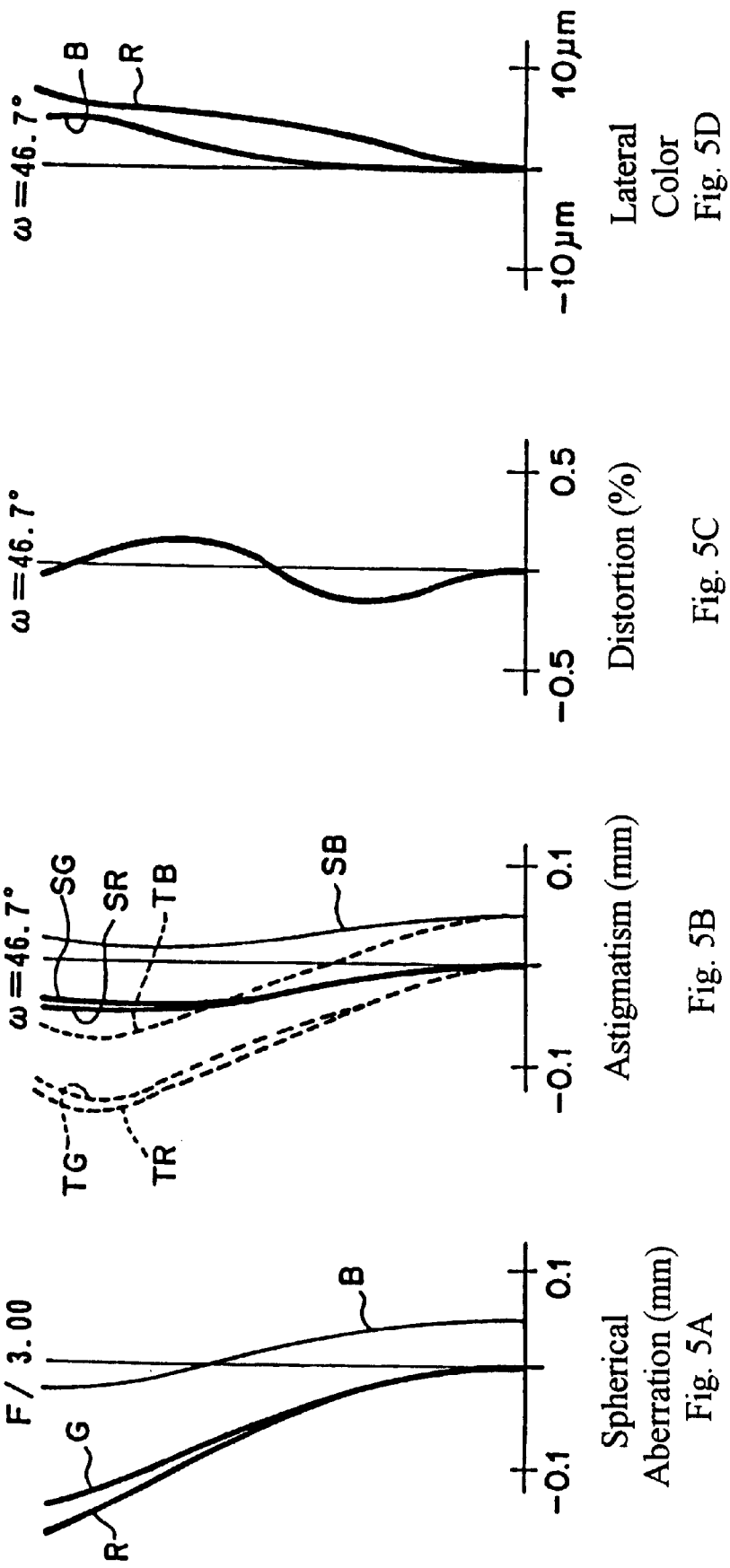

WIDE-ANGLE PROJECTION LENS AND A PROJECTION-TYPE IMAGE DISPLAY DEVICE

BACKGROUND OF THE INVENTION

Front-projection-type image display devices are known wherein a projection lens is positioned on the same side of a screen as the audience, with the images being viewed by being reflected by the screen, and rear-projection-type image display devices are known wherein a screen is positioned between the audience and the projection lens, with images being formed by light that is scattered by the screen. In rear-projection-type image display devices, a construction is known wherein a cabinet encloses the light source and the projection lens, and the screen is arranged on the front surface of the cabinet.

FIG. 6 illustrates, in a vertical cross-section, the basic configuration of components of a rear-projection-type image display device according to the prior art. Images formed on a liquid crystal display panel 12 are magnified and projected onto a screen 16 by a projection lens 11. Nearly collimated light from a light source 15 is irradiated onto the pixels of the liquid crystal display panel 12, and thus a light beam carrying image information is projected onto the back side of the screen 16 via the projection lens 11. The audience is positioned at the front side of the screen 16 and thus it sees magnified images by viewing from the left side of FIG. 6. For simplicity of illustration, only one liquid crystal display panel 12 is shown. However, liquid crystal projectors for projecting full-color images are generally used. These liquid crystal projectors separate white light from the light source 15 into three primary colors, such as R, G, and B, using dichroic mirrors and a separate liquid crystal display panel modulates a given color component with image information for that color component. The three color-component beams are then synthesized by arranging dichroic reflecting surfaces on surfaces within a glass beam-combiner 13, as is well known in the art. The screen 16 is located at a fixed distance "d" from the liquid crystal display panel 12 that is nearest the screen.

In the past, in such a cabinet-type, image display device, it has been required to minimize the volume of the entire device. In response to such demand, projection devices as disclosed in Japanese examined application H8-201688 have been developed. To make the volume of the entire image display device smaller, it is vital to make the projection distance, d (the distance between the liquid crystal display panel nearest the screen and the screen) short. Therefore, the projection lens must be provided with a wide field of view. In this prior-art example, by folding the light path using mirrors, the image display device is made more compact. However, the mirrors result in an increase in the weight of the image display device. This is disadvantages, and thus it would be desirable to make such an image display device more compact without increasing the weight of the image display device. For this purpose, a projection lens having a wider image angle than in this prior-art examples desired.

In recent years, a display method called "multi-display" has frequently been used, wherein an image to be displayed on a large screen is broken into segments that are arranged in rows and columns, with each segment being projected by separate projection units that are positioned in an array from top-to-bottom and from side-to-side. In a rear-projection-type display device used for such a multi-display, projection lenses having their distortion aberration very well corrected are required in order that adjacent images overlap one another properly at shaded portions of a large screen. The less distortion in the adjacent images, the less these images need to overlap one another at shaded portions of a large screen. More specifically, the distortion should desirably be less than or equal to 0.3%. Also, lateral color has to be minimized to a very small amount or eliminated, since it degrades image quality.

A projection lens having a half-image angle that exceeds 40 degrees is termed a "wide-angle" projection lens. It is said that making a wide-angle projection lens requires exceedingly high skills because the lens is required to be telecentric on its reducing side in order that color artifacts are not introduced in modulating the light with the liquid crystal display panels. In addition, favorable correction of distortion and lateral color is required, and this is not easy. Generally, in making such a wide-angle lens, a diaphragm is employed between a front lens group and a back lens group. However, these lens groups extensively lack symmetry. This makes the correction of distortion and lateral color difficult. The requirement that the projection lens be telecentric on its reducing side makes the favorable correction of these aberrations even more difficult.

BRIEF SUMMARY OF THE INVENTION

The present invention is a projection lens for a projection-type image display device which magnifies and projects image information that is input to a small display device, such as a liquid crystal display device or to a digital micro-mirror device (DMD). More particularly, the present invention is a wide-angle projection lens and a projection-type image display device that uses the projection lens.

The object of the invention is to provide a wide-angle projection lens having a shorter focal length and that is very well corrected for distortion aberration and lateral color so as to enable the wide-angle projection lens to be used in a rear-projection-type image display device that is more compact than image display devices currently available.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion, and lateral color, respectively, of the wide-angle projection lens of Embodiment 1;

FIGS. 4A–4D show the spherical aberration, astigmatism, distortion, and lateral color, respectively, of the wide-angle projection lens of Embodiment 2;

FIGS. 5A–5D show the spherical aberration, astigmatism, distortion, and lateral color, respectively, of the wide-angle projection lens of Embodiment 3.

DETAILED DESCRIPTION

Figure 1:
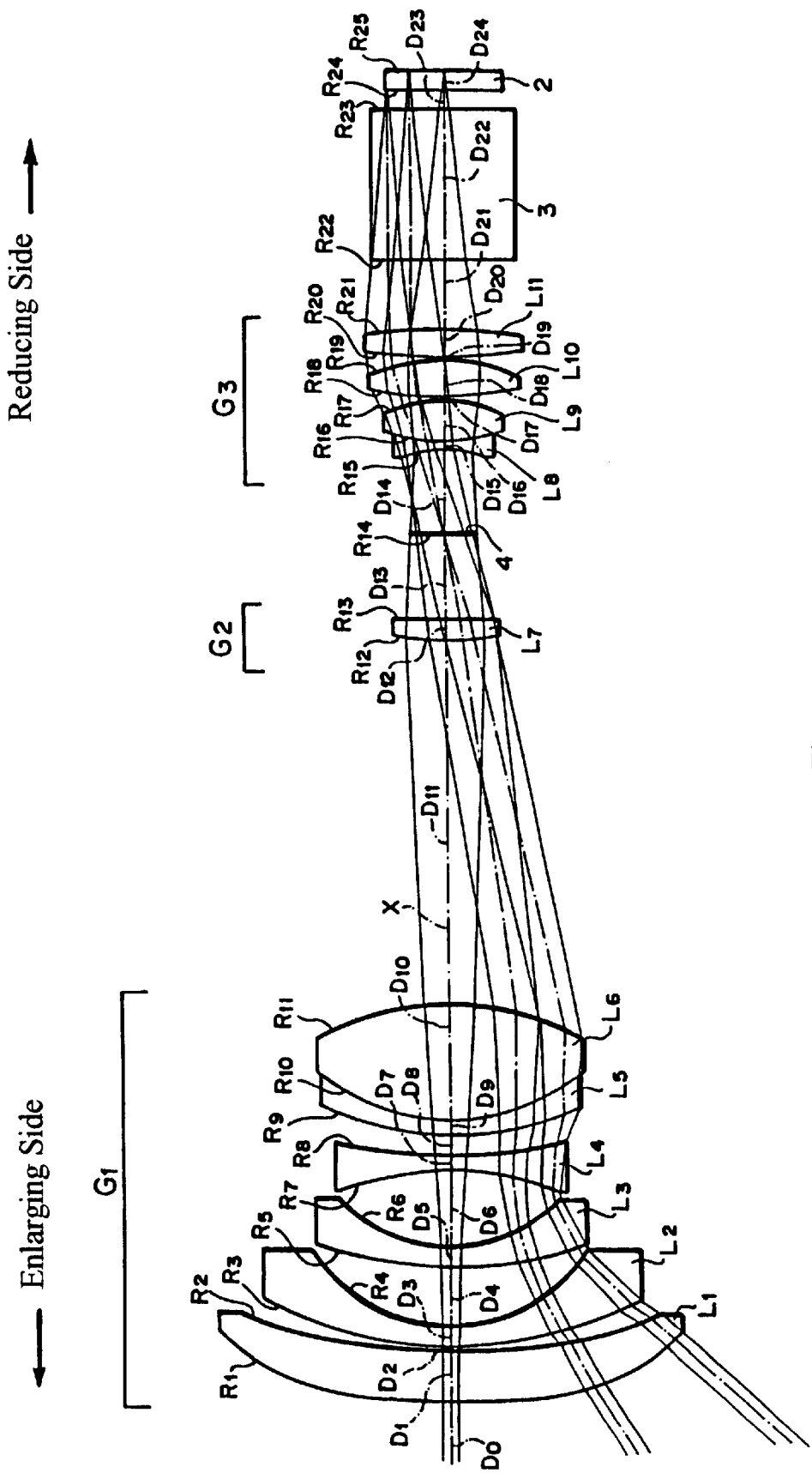
FIG. 1 shows the basic lens element configuration of a wide-angle projection lens and some components of a projection-type image display device according to a first embodiment of the invention. This figure also is representative of Embodiments 2 and 3 of the invention.

The wide-angle projection lens of the present invention is illustrated in FIG. 1 and includes the following components, in order from the enlarging side of the projection lens: a first lens group $G_1$ of negative refractive power, formed of a plurality of lens elements including a positive lens element and a negative lens element that are cemented together to form a cemented lens having negative refractive power; a second lens group $G_2$ of positive refractive power that includes at least one lens element of positive refractive power; a diaphragm 4; and a third lens group $G_3$ of positive refractive power, formed of a plurality of lens elements including a positive lens element and a negative lens element that are cemented together to form a cemented lens of positive refractive power. The "X" in FIG. 1 designates the optical axis. Further, the following Conditions (1)–(4) are satisfied:

$-7.5 < F_1/F < -2.5$   Condition (1)

$5.0 < F_2/F < 9.5$   Condition (2)

$3.0 < F_3/F < 4.8$   Condition (3)

$2.8 < F_3/Y < 4.5$   Condition (4)

where

F is the focal length of the wide-angle projection lens, $F_1$ is the focal length of the first lens group $G_1$.

$F_2$ is the focal length of the second lens group $G_2$.

$F_3$ is the focal length of the third lens group $G_3$, and

Y is the maximum image height.

In the first lens group $G_1$, the lens element $L_1$ that is positioned nearest the enlarging side includes an aspheric-shaped surface on at least one side thereof. Distortion and focus are adjusted by adjusting the on-axis spacing $D_2$, i.e., the on-axis spacing between the first lens element $L_1$ and the second lens $L_2$, in order from the enlarging side.

Of the lens elements in the wide-angle projection lens of the invention, the lens element having the thickest on-axis spacing D between surfaces is, preferably, located in the first lens group. This lens element is the positive lens element of the cemented lens in the first lens group. Further, the following Conditions (5) and (6) are preferably satisfied:

$N_{P1} < 1.620$   Condition (5)

$5.0 < F_{AD}/F < 6.0$   Condition (6)

where $N_{P1}$ is the index of refraction of the lens element having the largest on-axis spacing D between its surfaces, $F_{AD}$ is the focal length of the cemented lens in the first lens group, and F is as defined above.

Among the lens elements in the wide-angle projection lens of the present invention, the lens element having the surface with the largest radius of curvature is, preferably, positioned in the second lens group. Further, a positive lens element that is included in the second lens group preferably satisfies the following Condition (7):

$v_{P2} < 30$   Condition (7)

where $v_{P2}$ is the Abbe number of a positive lens element included in the second lens group.

In addition, a cemented lens that is included in the third lens group preferably satisfies the following Condition (8):

$40 < v_{P3} - v_{N3}$   Condition (8)

where $v_{P3}$ is the Abbe number of the positive lens element of the cemented lens included in the third lens group, and $v_{N3}$ is the Abbe number of the negative lens element of the cemented lens included in the third lens group.

Figure 2:
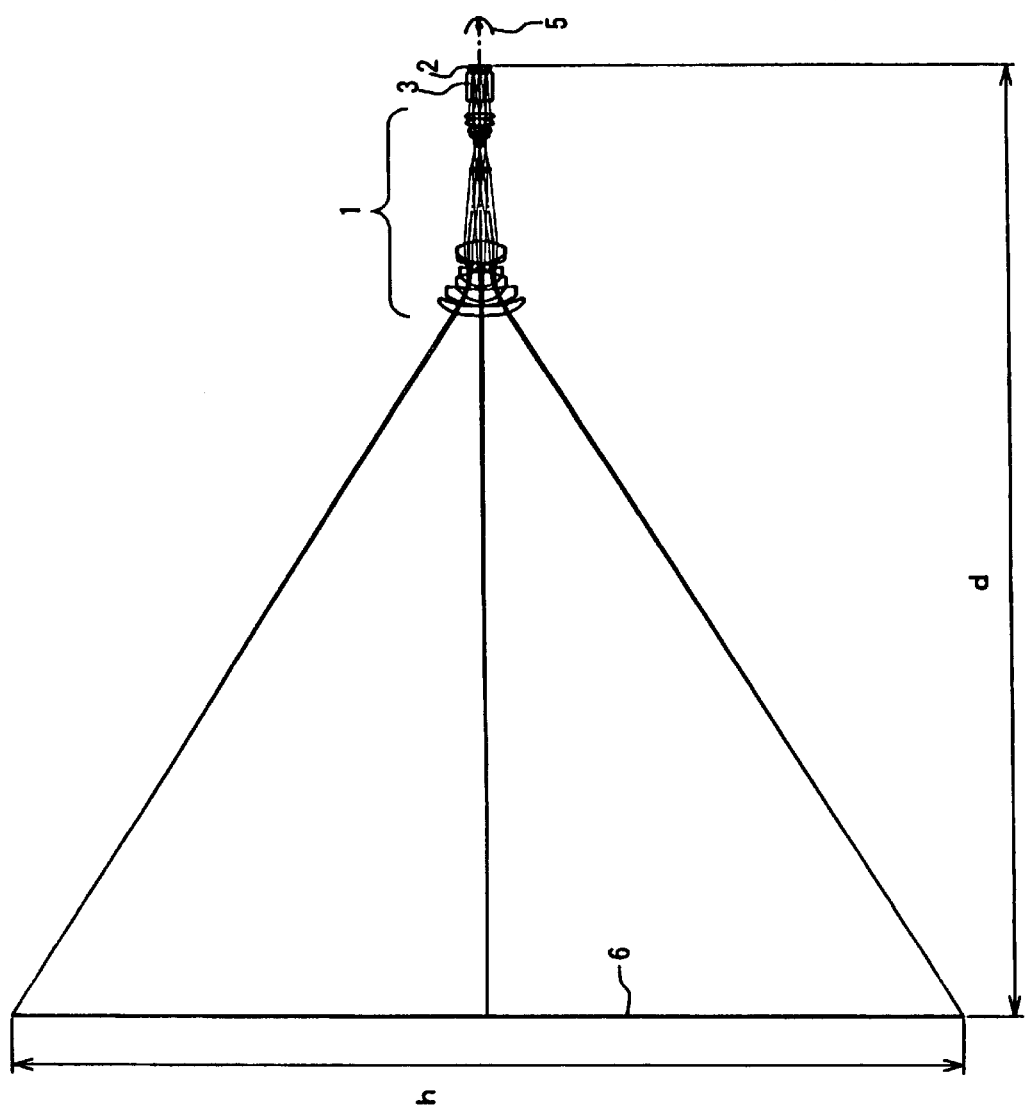
FIG. 2 shows a wide-angle projection lens according to Embodiment 1 in operation projecting an image onto a screen.

As shown in FIG. 2, the rear-projection-type image display device of the present invention includes a light source, the wide-angle projection lens discussed above, and a screen.

A beam of light from light source 5 which is nearly collimated is modulated with image information that has been input to the liquid crystal display panel array 2. The image on the display panel array 2 is magnified and projected leftward in the figure using the wide-angle projection lens 1. A glass block 3 may serve as a beam combiner for synthesizing differently colored beams (not illustrated) so that these too can be projected onto the screen 6 in order to create full-color images, if desired.

Referring again to FIG. 1, the lens element on the enlarging side of the first lens group $G_1$ (i.e., the first lens element $L_1$) includes at least one surface that is aspheric. The shape of the aspheric surface(s) is defined by Equation A below:

$Z = CY^2/\{1+(1-KC^2Y^2)^{1/2}\} + A_4Y^4 + A_6Y^6 + A_8Y^8 + A_{10}Y^{10}$   Equation A where Z is the length (in mm) of a line drawn from a point on the aspherical surface at distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th order aspherical coefficients.

The wide-angle projection lens of the invention makes adjustments to the focus by moving a single lens group along the optical axis. As mentioned above, the wide-angle projection lens of the invention is constructed to adjust the focus by changing the on-axis spacing between the first lens element $L_1$ and the second lens element $L_2$.

Among the lens elements of the wide-angle projection lens, the lens element with the thickest center (i.e., here, the sixth lens element $L_6$) is located in the first lens group $G_1$. This lens element is the positive lens element of the cemented lens in the first lens group $G_1$. Also, the lens element having the surface with the largest radius of curvature (of among the lens elements in the wide-angle projection lens) is arranged in the second lens group $G_2$.

Further, the wide-angle projection lens is constructed to satisfy the above Conditions (1)–(8).

FIG. 2 is a vertical cross-section of the wide-angle projection lens of Embodiment 1 in use projecting image data that has been electronically input to the liquid crystal display panel 2 as enlarged images onto the back surface of screen 6. A nearly collimated beam of light from light source 5 is modulated with image information by the beam being transmitted through the liquid crystal display panel 2. The images at the liquid crystal display panel 2 are then projected as enlarged images onto the back surface of screen 6, located at a fixed distance from the projection lens. In this figure, the audience watches the enlarged, projected images by viewing the screen 6 from the left side. For ease of illustration, only a single liquid crystal display panel 2 is shown. Generally, however, three liquid crystal projectors are used in order to display full-color images. This is achieved in a known manner by using a color separation optical system that uses dichroic mirrors to separate the light from light source 5 into three primary color component beams (such as R, G, and B) and using a different liquid crystal display panel 2 to modulate each color-component beam with image information for that color component. Glass block 3 (having dichroic reflecting surfaces mounted within it) is then used to combine the three separate beams into a full color beam that is projected by the lens.

The effectiveness of the wide-angle projection lens of the present invention and of a projection-type image display device that uses the lens will now be explained. The wide-angle projection lens of the present invention is formed of, in order from the enlarging side, a first lens group $G_1$ of negative refractive power, a second lens group $G_2$ of positive refractive power, an aperture, and a third lens group $G_3$ of positive refractive power. This arrangement allows the lens to have a long back focus, even though the lens has a wide-angle field of view. A long back focus is necessary in order that there be sufficient room to insert the glass block 3 that is needed to combine the three beams, discussed above.

If the lens element on the enlarging side of the first lens group includes a surface that is aspheric, it is possible to favorably correct distortion aberration. Indeed, it is preferable that both of the surfaces of this lens element be aspheric. Further, in the first lens group $G_1$, there is arranged a positive lens element which has the thickest on-axis spacing D between surfaces of any lens element of the wide-angle projection lens. This lens element which works to balance some of the negative Petzval sum generated by the negative refractive power of the first lens group $G_1$.

The positive refractive power of the second lens group $G_2$ plays a role, along with the positive refractive power of the third lens group $G_3$, in defining the proper negative refractive power of the first lens group $G_1$ so as to obtain a wide-angle projection lens having a short focal length. If a surface of the second lens group has too strong a refractive power, the positioning sensitivity of this surface will be excessive and imaging performance, especially of the rays in the tangential image place, will likely be degraded even if a minor error in positioning during assembly occurs. Among the lens element surfaces in the wide-angle projection lens, by arranging, in the second lens group $G_2$, the lens element surface having the largest radius of curvature, a larger tolerance for positioning error is provided, thus improving manufacturing productivity.

The purpose of the various Conditions (1)–(8) will now be described.

Condition (1), in effect, defines the power of the first lens group $G_1$ relative to that of the wide-angle projection lens. If the lower limit of Condition (1) is not satisfied, a sufficient back focus cannot be provided. On the other hand, if the upper limit of Condition (1) is not satisfied, coma becomes so large that it would be difficult to correct.

Condition (2), in effect, defines the power of the second lens group $G_2$ relative to that of the wide-angle projection lens. If the lower limit of Condition (2) is not satisfied, coma becomes so large that it would be difficult to correct. On the other hand, if the upper limit of Condition (2) is not satisfied, the external diameter of the first lens group $G_1$ must be too big to be practical.

Condition (3), in effect, defines the power of the third lens group $G_3$ relative to that of the wide-angle projection lens. If the lower limit of Condition (3) is not satisfied, a proper back focus cannot be obtained. If the upper limit of Condition (3) is exceeded, the total length of the projection lens becomes too long.

Condition (4), in effect, defines the power of the third lens group $G_3$ relative to the maximum image height. If the lower limit of Condition (4) is not satisfied, the positive refractive power of the third lens group will be incompatible with the requirement that the projection lens be telecentric on the reducing (i.e., the small conjugate) side, and favorable correction of aberrations will become difficult. If the upper limit of Condition (4) is exceeded, the total length of the projection lens will become too long.

Conditions (5) and (6) define parameters of the cemented lens in the first lens group $G_1$. This cemented lens has overall negative refractive power and includes the lens element of the projection lens with the thickest on-axis spacing between its surfaces. It is preferable that at least one of Conditions (5) and (6) be satisfied. If Condition (5) is not satisfied, the Petzval sum is so negative that the curvature of the image surface will be excessive. Condition (6) defines the focal length of the cemented lens in the first lens group relative to the focal length of the projection lens. If the lower limit is not satisfied, spherical aberration will become difficult to favorably correct. If the upper limit is exceeded, the Petzval sum becomes so negative, that the curvature of the image surface will be excessive.

Condition (7) defines an upper limit for the Abbe number of the optical material of any positive lens element(s) included in the second lens group $G_2$. In other words, any positive lens element arranged in the second lens group $G_2$ should satisfy this condition, regardless of the number of positive lens elements in the second lens group $G_2$. If Condition (7) is not satisfied, chromatic aberration, especially axial chromatic aberration, becomes so large that correction is difficult.

Condition (8) specifies a lower limit for the difference in Abbe number between the positive and negative lens elements of the cemented lens in the third lens group. This cemented lens corrects the axial chromatic aberration. If Condition (8) is satisfied, the chromatic aberration can be favorably corrected.

By making the wide-angle projection lens of the invention satisfy the above conditions, distortion aberration and the lateral color can be favorably corrected. Therefore, a rear-projection-type image display device that uses the wide-angle projection lens of the invention can be made more compact and lighter in weight.

Figure 6:
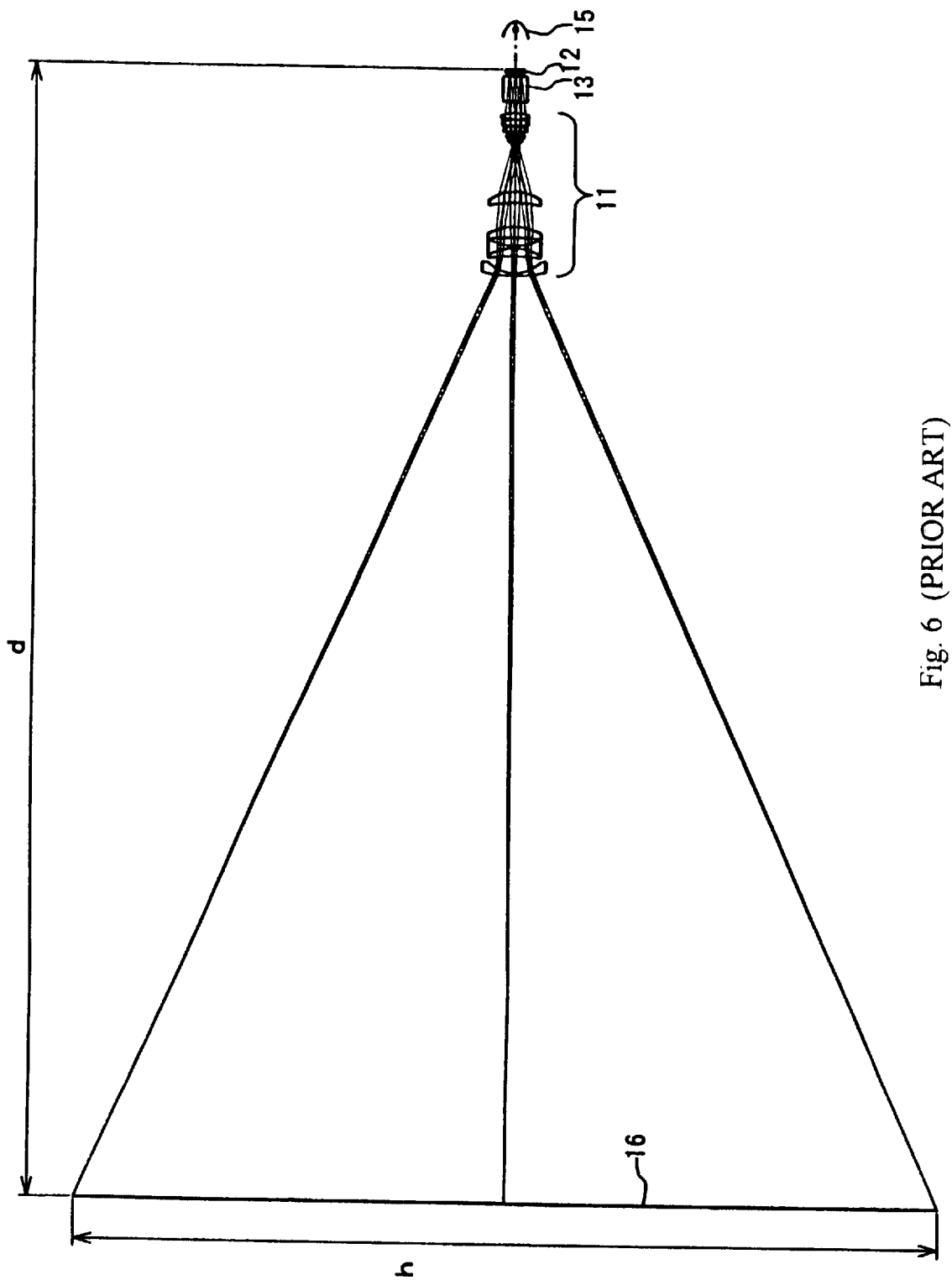
FIG. 6 shows a prior art, rear-projection-type projection lens in operation projecting an image onto a screen.

The compactness of the invention as compared to the prior art is apparent by comparing the device shown in FIG. 2 with the device shown in FIG. 6. In FIG. 2, the dimension h of the screen 6 is 806.5 mm, whereas the dimension h of the screen 16 in FIG. 6 is 810.7 mm. This difference is due to the smaller distortion of the projection lens of the present invention. Thus, the screen size in both figures is practically the same. However, the dimension d (a conjugate length) of the device in FIG. 2 is merely 800 mm, as compared to 1046 mm for this same distance in FIG. 6. Thus, the present invention enables a rear-projection-type image display device that is more compact than in the prior art, and which provides improved performance with regard to distortion and lateral color. Whereas mirrors can be used to fold the projected light path, thus-making the prior art device more compact, the overall weight of the rear-projection-type image display device will be increased. However, by using the wide-angle projection lens of the present invention, since it has a shorter focal length than previously available, a compact and light-weight, rear-projection-type image display device can be provided without the additional weight of mirrors to fold the beam path.

Further, it is also possible to include such mirrors to fold the light path, thereby obtaining an even more compact, though heavier, rear-projection-type image display device.

Because the distortion and lateral color of the wide-angle projection lens of the present invention are more favorably corrected than in the prior art, in the case of using "multi-display" projection so as to provide a large screen size with high quality imaging, the display segments of the image can be more precisely aligned and have less separation (i.e., shaded margins) between the segmented image portions. This provides a much improved viewing experience.

Various embodiments of the invention will now be discussed in detail.

Embodiment 1

As described previously, FIG. 1 is illustrative of this embodiment. In this embodiment, the first lens group $G_1$ is formed of, in order from the enlarging side: a first lens element $L_1$ of positive refractive power and having a meniscus shape with its convex surface on the enlarging side and with both lens surfaces being aspheric and having an identical radius of curvature near the optical axis; a second lens element $L_2$ of negative refractive power and having a meniscus shape with its convex surface on the enlarging side; a third lens element $L_3$ of negative refractive power and having a meniscus shape with its convex surface on the enlarging side; a fourth lens element $L_4$ that is biconcave having surfaces of different radii of curvature, with the surface having the smaller radius of curvature on the enlarging side; a fifth lens element $L_5$ of negative refractive power and having a meniscus shape with its convex surface on the enlarging side; and a sixth lens element $L_6$ having the greatest on-axis spacing D between its surfaces (i.e., the lens thickness) among all lens elements in the wide-angle projection lens of the invention. The fifth lens element $L_5$ and the sixth lens element $L_6$ have adjacent surfaces with the same radius of curvature, and these surfaces are joined to form a cemented lens.

The second lens group $G_2$ is formed of a seventh lens element $L_7$ of positive refractive power and a meniscus shape with its convex surface on the enlarging side. Among the lens elements of the wide-angle projection lens of the invention, the lens surface on the reducing side of lens group $G_2$ has the largest radius of curvature.

The third lens group $G_3$ is formed of, in order from the enlarging side, a cemented lens formed of an eighth lens element $L_8$ that is biconcave having surfaces of different radii of curvature, with the surface of smaller radius of curvature on the enlarging side; a ninth lens element $L_9$ formed of a biconvex lens having surfaces of different radii of curvature, with the surface of smaller radius of curvature on the reducing side; a tenth lens element $L_{10}$ formed of a biconvex lens having surfaces of different radii of curvature, with the surface of smaller radius of curvature on the reducing side, and an eleventh lens element $L_{11}$ formed of a biconvex lens having surfaces of different radii of curvature, with the surface of smaller radius of curvature on the reducing side.

Table 1 below lists the surface number #, in order from the enlarging side (with surface #0 being the screen and surface #25 being the display surface of the liquid crystal display panel(s)), the radius of curvature R (in mm) near the optical axis of each surface, the on-axis spacing D (in mm) between surfaces, as well as the index of refraction $N_d$ and Abbe number $v_d$ (both at the d line) of each lens element of this embodiment. In the lower portion of the table are listed the value of the f-number $F_{NO.}$, the half-image angle ω, and the distance d (in mm) between conjugate points.

TABLE 1

| # | R | D | $N_d$ | $v_d$ |
|---|---|---|---|---|
| 0 | ∞ | 592.07 | | |
| 1* | 256.842 | 8.00 | 1.49018 | 57.8 |
| 2* | 256.842 | 0.60 | | |
| 3 | 60.393 | 3.50 | 1.78590 | 44.2 |
| 4 | 25.271 | 9.25 | | |
| 5 | 66.247 | 3.00 | 1.83400 | 37.2 |
| 6 | 22.532 | 12.10 | | |
| 7 | −46.803 | 2.50 | 1.78590 | 44.2 |
| 8 | 100.989 | 3.01 | | |
| 9 | 48.807 | 2.12 | 1.84666 | 23.9 |
| 10 | 31.833 | 18.00 | 1.60342 | 38.0 |
| 11 | −42.353 | 57.42 | | |
| 12 | 48.347 | 3.00 | 1.84666 | 23.9 |
| 13 | 490.773 | 13.66 | | |
| 14 | ∞(diaphragm) | 13.12 | | |
| 15 | −18.870 | 1.35 | 1.84666 | 23.9 |
| 16 | 29.279 | 6.64 | 1.48749 | 70.2 |
| 17 | −19.773 | 0.30 | | |
| 18 | 57.642 | 6.00 | 1.48749 | 70.2 |
| 19 | −28.187 | 0.30 | | |
| 20 | 102.647 | 4.26 | 1.68893 | 31.1 |
| 21 | −68.560 | 11.00 | | |
| 22 | ∞ | 23.00 | 1.51633 | 64.1 |
| 23 | ∞ | 2.75 | | |
| 24 | ∞ | 3.00 | 1.51633 | 64.1 |
| 25 | ∞ | | | |
| $F_{NO}$ = 3.0 | | ω = 46.7° | | d = 800 mm |

Those surface (1 and 2) above with an asterisk mark to the right of the surface number # are aspheric, with the shape of the aspheric surface being defined by Equation A above. The values of each of the constants K and $A_4$–$A_{10}$ of the aspherical surfaces are listed in Table 2 below.

TABLE 2

| # | K | $A_4$ | $A_6$ | $A_8$ | $A_{10}$ |
|---|---|---|---|---|---|
| 1 | $1.79000 \times 10^{-1}$ | $6.86704 \times 10^{-6}$ | $-2.84461 \times 10^{-9}$ | $1.50993 \times 10^{-12}$ | $-1.94000 \times 10^{-16}$ |
| 2 | $1.99000 \times 10^{-1}$ | $6.01710 \times 10^{-6}$ | $-3.21297 \times 10^{-9}$ | $9.18780 \times 10^{-13}$ | $-1.67004 \times 10^{-16}$ |

FIGS. 3A–3D show the spherical aberration, astigmatism, distortion and lateral color, respectively, for Embodiment 1. In FIGS. 3A and 3B, curves are given for G (λ=455 nm), B (λ=546.1 nm) and R (λ=615 nm). In FIG. 3B, the astigmatism is shown for each of these wavelengths for both the sagittal (S) and tangential (T) image surfaces, with the solid lines SG, SB, SR indicating the astigmatism for the sagittal image surfaces and the dotted lines TG, TB, TR indicating the astigmatism for the tangential image surface. In these aberration figures, ω is the half-image angle. As is apparent from these figures these aberrations are favorably corrected in this embodiment.

Embodiment 2

Embodiment 2 has the same basic lens element configuration as that of Embodiment 1, and thus the lens element configuration as shown in FIG. 1 applies to this embodiment as well.

Table 3 below lists the surface number #, in order from the enlarging side (with surface #0 being the screen and surface #25 being the display surface of the liquid crystal display panel(s)), the radius of curvature R (in mm) near the optical axis of each surface, the on-axis spacing D (in mm) between surfaces, as well as the index of refraction $N_d$ and Abbe number $v_d$ (both at the d line) of each lens element of this embodiment. In the lower portion of the table are listed the value of the f-number $F_{NO.}$, the half-image angle ω, and the distance d (in mm) between the conjugate points.

TABLE 3

| # | R | D | $N_d$ | $v_d$ |
|---|---|---|---|---|
| 0 | ∞ | 593.26 | | |
| 1* | 395.752 | 7.99 | 1.49018 | 57.8 |
| 2* | 395.752 | 1.26 | | |
| 3 | 56.313 | 3.91 | 1.78590 | 44.2 |
| 4 | 24.670 | 9.52 | | |
| 5 | 77.628 | 3.00 | 1.83400 | 37.2 |
| 6 | 23.242 | 10.96 | | |
| 7 | −47.160 | 2.50 | 1.78590 | 44.2 |
| 8 | 102.510 | 1.26 | | |
| 9 | 43.166 | 2.07 | 1.84666 | 23.9 |
| 10 | 28.163 | 15.22 | 1.59551 | 39.2 |
| 11 | −52.032 | 57.69 | | |
| 12 | 46.581 | 3.44 | 1.84666 | 23.9 |
| 13 | 8472.494 | 14.84 | | |
| 14 | ∞(diaphragm) | 13.50 | | |
| 15 | −18.550 | 1.27 | 1.84666 | 23.9 |
| 16 | 29.726 | 6.30 | 1.48749 | 70.2 |
| 17 | −19.768 | 0.56 | | |
| 18 | 56.493 | 5.99 | 1.48749 | 70.2 |
| 19 | −27.815 | 0.79 | | |
| 20 | 106.630 | 4.27 | 1.66680 | 33.1 |
| 21 | −71.518 | 11.61 | | |
| 22 | ∞ | 23.00 | 1.51633 | 64.1 |
| 23 | ∞ | 2.75 | | |
| 24 | ∞ | 3.00 | 1.51633 | 64.1 |
| 25 | ∞ | | | |
| $F_{NO}$ = 3.0 | | ω = 46.7° | | d = 800 mm |

The values of each of the constants K and $A_4$–$A_{10}$ of the aspherical surfaces indicated in Table 3 are shown in Table 4.

TABLE 4

| # | K | $A_4$ | $A_6$ | $A_8$ | $A_{10}$ |
|---|---|---|---|---|---|
| 1 | $1.79235 \times 10^{-1}$ | $6.91970 \times 10^{-6}$ | $-2.90711 \times 10^{-9}$ | $1.49780 \times 10^{-12}$ | $-1.91702 \times 10^{-16}$ |
| 2 | $1.99248 \times 10^{-1}$ | $6.06743 \times 10^{-6}$ | $-3.17459 \times 10^{-9}$ | $9.24340 \times 10^{-13}$ | $-1.65747 \times 10^{-16}$ |

FIGS. 4A–4D show the spherical aberration, astigmatism, distortion and lateral color, respectively, for Embodiment 2. In FIGS. 4A and 4B, curves are given for G (λ=455 nm), B (λ=546.1 nm) and R (λ=615 nm). In FIG. 4B, the astigmatism is shown for each of these wavelengths for both the sagittal (S) and tangential (T) image surfaces, with the solid lines SG, SB, SR indicating the astigmatism for the sagittal image surfaces and the dotted lines TG, TB, TR indicating the astigmatism for the tangential image surface. In these aberration figures, ω is the half-image angle. As is apparent from these figures, these aberrations are favorably corrected in this embodiment.

Embodiment 3

Embodiment 3 has the same basic lens element configuration as that of Embodiment 1, and thus the lens element configuration as shown in FIG. 1 applies to this embodiment as well.

Table 5 below lists the surface number #, in order from the enlarging side (with surface #0 being the screen and surface #25 being the display surface of the liquid crystal display panel(s)), the radius of curvature R (in mm) near the optical axis of each surface, the on-axis spacing D (in mm) between surfaces, as well as the index of refraction $N_d$ and Abbe number $v_d$ (both at the d line) of each lens element of this embodiment. In the lower portion of the table are listed the value of the f-number $F_{NO.}$, the half-image angle ω, and the distance d (in mm) between conjugate points.

TABLE 5

| # | R | D | $N_d$ | $v_d$ |
|---|---|---|---|---|
| 0 | ∞ | 591.55 | | |
| 1* | 279.112 | 7.90 | 1.49018 | 57.8 |
| 2* | 279.112 | 1.65 | | |
| 3 | 75.173 | 3.54 | 1.78590 | 44.2 |
| 4 | 25.091 | 9.22 | | |
| 5 | 62.401 | 3.50 | 1.83400 | 37.2 |
| 6 | 23.965 | 11.74 | | |
| 7 | −52.261 | 3.00 | 1.77250 | 49.6 |
| 8 | 109.727 | 4.68 | | |
| 9 | 58.067 | 2.83 | 1.84666 | 23.9 |
| 10 | 36.862 | 18.01 | 1.61293 | 37.0 |
| 11 | −40.702 | 55.96 | | |
| 12 | 48.468 | 3.00 | 1.84666 | 23.9 |
| 13 | 207.724 | 11.73 | | |
| 14 | ∞(diaphragm) | 13.32 | | |
| 15 | −19.513 | 1.01 | 1.84666 | 23.9 |
| 16 | 29.283 | 6.84 | 1.48749 | 70.2 |
| 17 | −20.093 | 0.47 | | |
| 18 | 62.223 | 5.46 | 1.48749 | 70.2 |
| 19 | −29.213 | 0.30 | | |
| 20 | 92.477 | 4.19 | 1.69895 | 30.1 |
| 21 | −63.528 | 11.32 | | |
| 22 | ∞ | 23.00 | 1.51633 | 64.1 |
| 23 | ∞ | 2.75 | | |
| 24 | ∞ | 3.00 | 1.51633 | 64.1 |
| 25 | ∞ | | | |
| $F_{NO}$ = 3.0 | | ω = 46.7° | | d = 800 mm |

The values of each of the constants K and $A_4$–$A_{10}$ of the aspherical surfaces indicated in Table 5 are shown in Table 6.

TABLE 6

| # | K | $A_4$ | $A_6$ | $A_8$ | $A_{10}$ |
|---|---|---|---|---|---|
| 1 | $1.79231 \times 10^{-1}$ | $6.85213 \times 10^{-6}$ | $-2.86447 \times 10^{-9}$ | $1.50190 \times 10^{-12}$ | $-1.94563 \times 10^{-16}$ |
| 2 | $1.99252 \times 10^{-1}$ | $6.07445 \times 10^{-6}$ | $-3.21560 \times 10^{-9}$ | $9.11092 \times 10^{-13}$ | $-1.70848 \times 10^{-16}$ |

FIGS. 5A–5D show the spherical aberration, astigmatism, distortion and lateral color, respectively, for Embodiment 3. In FIGS. 5A and 5B, curves are given for G (λ=455 nm), B (λ=546.1 nm) and R (λ=615 nm). In FIG. 5B, the astigmatism is shown for each of these wavelengths for both the sagittal (S) and tangential (T) image surfaces, with the solid lines SG, SB, SR indicating the astigmatism for the sagittal image surfaces and the dotted lines TG, TB, TR indicating the astigmatism for the tangential image surface. In these aberration figures, ω is the half-image angle. As is apparent from these figures these aberrations are favorably corrected in this embodiment.

In Table 7 below are listed the focal length F and the values for the various terms in Conditions (1)–(8), for each of Embodiments –3.

TABLE 7

| | Embodiment 1 | Embodiment 2 | Embodiment 3 |
|---|---|---|---|
| F | =8.3684373 | 8.3919859 | 8.3680408 |
| Condition(1): $F_1/F$ | =−4.5 | −3.2 | −6.0 |
| Condition(2): $F_2/F$ | =7.5 | 6.6 | 8.8 |
| Condition(3): $F_3/F$ | =3.9 | 4.1 | 3.7 |
| Condition(4): $F_3/Y$ | =3.6 | 3.9 | 3.5 |
| Condition(5): $N_{P1}$ | =1.603 | 1.596 | 1.613 |
| Condition(6): $F_{AD}/F$ | =5.4 | 5.7 | 5.5 |
| Condition(7): $\upsilon_{P2}$ | =23.9 | 23.9 | 23.9 |
| Condition(8): $\upsilon_{P3}-\upsilon_{N3}$ | =46.3 | 46.3 | 46.3 |

As is apparent by comparing the above condition values to the conditions themselves, each of the Embodiments 1–3 satisfies Conditions (1)–(8) and, as is apparent from FIGS. 3A–5D, Embodiments 1–3 provide a lens that is properly termed a wide-angle lens, as the half-image angle is 46.7 degrees in each case.

The invention being thus described, it will be obvious that the same may be varied in many ways. For example, the radii of curvature R and the surface spacings D can be readily scaled so as to achieve a lens of a desired focal length or field of view. In the above Embodiments 1–3, the wide-angle projection lens of the invention is used as a projection lens for a projector having a transmission-type liquid crystal display panel. However, it is not intended that the use of the present invention be limited in this manner, as the wide-angle projection lens may also be used as a projection lens in devices that employ reflection-type liquid crystal display panels or other known optical modulators, such as DMD arrays. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle projection lens, comprising the following components in sequential order from the enlarging side of the projection lens:

a first lens group of negative refractive power, said first lens group including a cemented lens formed of a negative lens element that is cemented to a positive lens element, in that relative order from the enlarging side;

a second lens group of positive refractive power that includes a lens element of positive refractive power;

a diaphragm; and a third lens group of positive refractive power, said third lens group including a negative lens element that is cemented to a positive lens element;

wherein the following Conditions (1)–(4) are satisfied $-7.5 < F_1/F < -2.5$      Condition (1)

$5.0 < F_2/F < 9.5$      Condition (2)

$3.0 < F_3/F < 4.8$      Condition (3)

$2.8 < F_3/Y < 4.5$      Condition (4)

where

F is the focal length of the wide-angle projection lens, $F_1$ is the focal length of the first lens group $G_1$, $F_2$ is the focal length of the second lens group $G_2$, $F_3$ is the focal length of the third lens group $G_3$, and Y is the maximum image height.

2. The wide-angle projection lens of claim 1, wherein:

the first lens element includes at least one surface that is aspheric; and the on-axis spacing between the first lens element and the second lens element is adjustable in order to prevent what would otherwise be a change in image surface position due to a change in projection distance.

3. The wide-angle projection lens of claim 1, wherein the lens element of the wide-angle projection lens having the greatest on-axis spacing between its surfaces is located in the first lens group.

4. The wide-angle projection lens of claim 2, wherein the lens element of the wide-angle projection lens having the greatest on-axis spacing between its surfaces is located in the first lens group.

5. The wide-angle projection lens of claim 3, wherein said lens element having the greatest on-axis spacing between its surfaces forms part of a cemented lens, and wherein at least one of the following Conditions (5) and (6) is satisfied:

$N_{P1} < 1.620$      Condition (5)

$5.0 < F_{AD}/F < 6.0$      Condition (6)

where $N_{P1}$ is the index of refraction of the lens element of the wide-angle projection lens having the greatest on-axis thickness, $F_{AD}$ is the focal length of the cemented lens in the first lens group, and F is the focal length of the wide-angle projection lens.

6. The wide-angle projection lens of claim 4, wherein said lens element having the greatest on-axis spacing between its surfaces forms part of a cemented lens, and wherein at least one of the following Conditions (5) and (6) is satisfied:

$$N_{P1} < 1.620 \quad \text{Condition (5)}$$

$$5.0 < F_{AD}/F < 6.0 \quad \text{Condition (6)}$$

where $N_{P1}$ is the index of refraction of the lens element of the wide-angle projection lens having the greatest on-axis thickness, $F_{AD}$ is the focal length of the cemented lens in the first lens group, and F is the focal length of the wide-angle projection lens.

7. The wide-angle projection lens of claim 1, wherein the lens element surface of the wide-angle projection lens having the largest radius of curvature is located in the second lens group.

8. The wide-angle projection lens of claim 2, wherein the lens element surface of the wide-angle projection lens having the largest radius of curvature is located in the second lens group.

9. The wide-angle projection lens of claim 3, wherein the lens element surface of the wide-angle projection lens having the largest radius of curvature is located in the second lens group.

10. The wide-angle projection lens of claim 1, wherein a positive lens element included in the second lens group satisfies the following Condition (7):

$$\nu_{P2} < 30 \quad \text{Condition (7)}$$

where $\nu_{P2}$ is the Abbe number of said positive lens element included in the second lens group.

11. The wide-angle projection lens of claim 2, wherein a positive lens element included in the second lens group satisfies the following Condition (7):

$$\nu_{P2} < 30 \quad \text{Condition (7)}$$

where $\nu_{P2}$ is the Abbe number of said positive lens element included in the second lens group.

12. The wide-angle projection lens of claim 3, wherein a positive lens element included in the second lens group satisfies the following Condition (7):

$$\nu_{P2} < 30 \quad \text{Condition (7)}$$

where $\nu_{P2}$ is the Abbe number of said positive lens element included in the second lens group.

13. The wide-angle projection lens of claim 7, wherein a positive lens element included in the second lens group satisfies the following Condition (7):

$$\nu_{P2} < 30 \quad \text{Condition (7)}$$

where $\nu_{P2}$ is the Abbe number of said positive lens element included in the second lens group.

14. The wide-angle projection lens of claim 1, wherein a cemented lens included in the third lens group satisfies the following Condition (8):

$$40 < \nu_{P3} - \nu_{N3} \quad \text{Condition (8)}$$

where $\nu_{P3}$ is the Abbe number of the positive lens element of said cemented lens, and $\nu_{N3}$ is the Abbe number of the negative lens element of said cemented lens.

15. The wide-angle projection lens of claim 2, wherein a cemented lens included in the third lens group satisfies the following Condition (8):

$$40 < \nu_{P3} - \nu_{N3} \quad \text{Condition (8)}$$

where $\nu_{P3}$ is the Abbe number of the positive lens element of said cemented lens, and $\nu_{N3}$ is the Abbe number of the negative lens element of said cemented lens.

16. The wide-angle projection lens of claim 3, wherein a cemented lens included in the third lens group satisfies the following Condition (8):

$$40 < \nu_{P3} - \nu_{N3} \quad \text{Condition (8)}$$

where $\nu_{P3}$ is the Abbe number of the positive lens element of said cemented lens, and $\nu_{N3}$ is the Abbe number of the negative lens element of said cemented lens.

17. The wide-angle projection lens of claim 7, wherein a cemented lens included in the third lens group satisfies the following Condition (8):

$$40 < \nu_{P3} - \nu_{N3} \quad \text{Condition (8)}$$

where $\nu_{P3}$ is the Abbe number of the positive lens element of said cemented lens, and $\nu_{N3}$ is the Abbe number of the negative lens element of said cemented lens.

18. The wide-angle projection lens of claim 10, wherein a cemented lens included in the third lens group satisfies the following Condition (8):

$$40 < \nu_{P3} - \nu_{N3} \quad \text{Condition (8)}$$

where $\nu_{P3}$ is the Abbe number of the positive lens element of said cemented lens, and $\nu_{N3}$ is the Abbe number of the negative lens element of said cemented lens.

19. The wide-angle projection lens of claim 1, in combination with an image display device that includes a screen.

20. The wide-angle projection lens of claim 2, in combination with an image display device that includes a screen.

21. The wide-angle projection lens of claim 3, in combination with an image display device that includes a screen.

22. The wide-angle projection lens of claim 5, in combination with an image display device that includes a screen.

23. The wide-angle projection lens of claim 7, in combination with an image display device that includes a screen.

24. The wide-angle projection lens of claim 10, in combination with an image display device that includes a screen.

25. The wide-angle projection lens of claim 14, in combination with an image display device that includes a screen.

\* \* \* \* \*

UNITED STATES PATENT AND TRADEMARK OFFICE
CERTIFICATE OF CORRECTION

PATENT NO. : 6,542,316 B2
DATED : April 1, 2003
INVENTOR(S) : Yoneyama

It is certified that error appears in the above-identified patent and that said Letters Patent is hereby corrected as shown below:

<u>Title page,</u>
Item [57], ABSTRACT,
Line 9, change "lenses arranged" to -- lenses are arranged --;

<u>Column 1,</u>
Line 59, change "examples" to -- example is --;

<u>Column 5,</u>
Line 46, change "image place" to -- image plane --;

<u>Column 6,</u>
Line 28, change "negative, that" to -- negative that --;

<u>Column 8,</u>
Line 18, change "$F_{NO}$" to -- $F_{NO}$ --;
Line 48, change "surface" to -- surfaces --;

<u>Column 9,</u>
Line 22, change "$F_{NO}$" to -- $F_{NO}$ --; and

<u>Column 10,</u>
Line 25, change "$F_{NO}$" to -- $F_{NO}$ --.

Signed and Sealed this

Nineteenth Day of August, 2003

JAMES E. ROGAN
*Director of the United States Patent and Trademark Office*